Sept. 26, 1967  K. F. SMITH ETAL  3,344,277
RADIATION MONITOR WITH BACKGROUND COMPENSATION
Filed Feb. 23, 1965  2 Sheets-Sheet 1
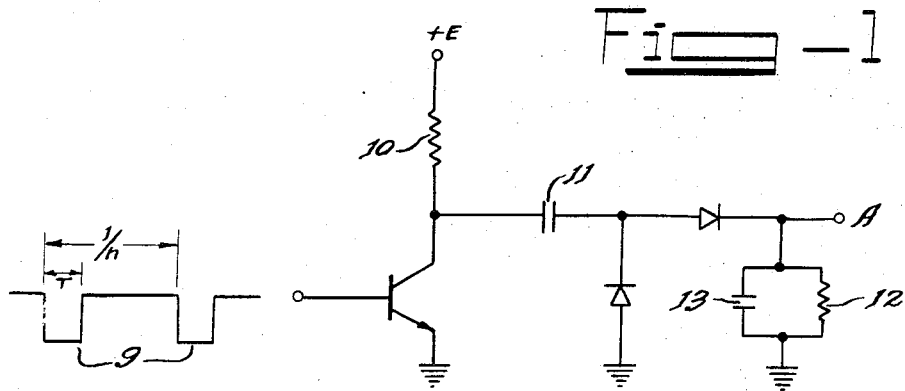
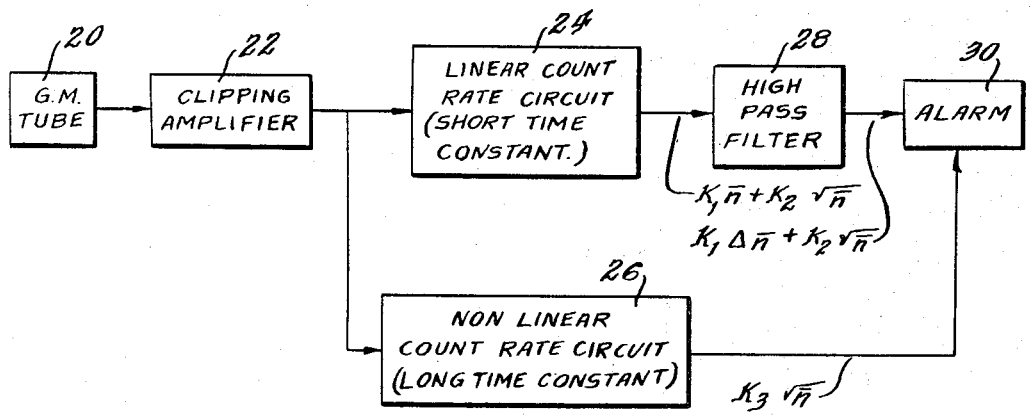
INVENTORS
Kent F. Smith
BY Jack B. Thompson
Roland A. Anderson
Attorney

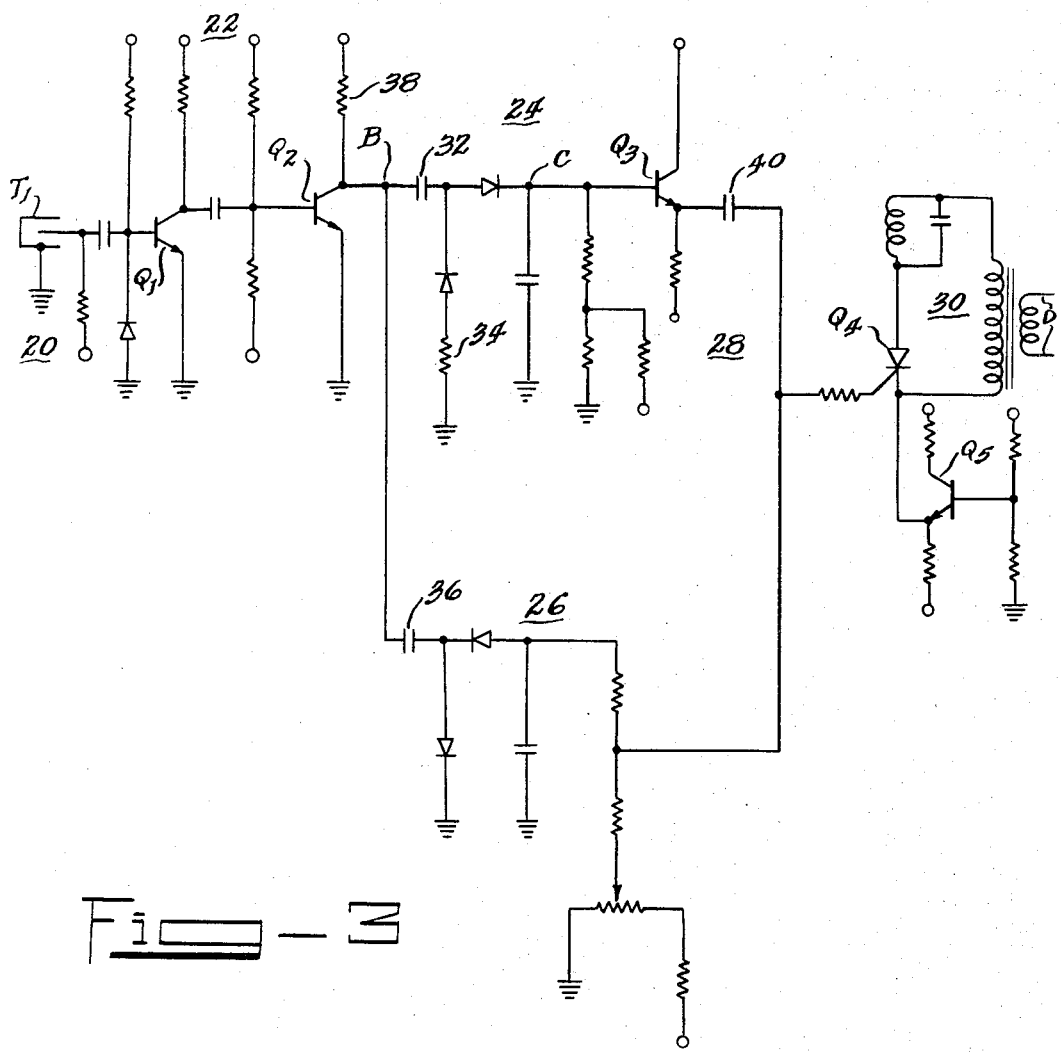

3,344,277
RADIATION MONITOR WITH BACKGROUND COMPENSATION
Kent F. Smith and Jack B. Thompson, Idaho Falls, Idaho, assignors to the United States of America as represented by the United States Atomic Energy Commission
Filed Feb. 23, 1965, Ser. No. 434,724
5 Claims. (Cl. 250—83.6)

ABSTRACT OF THE DISCLOSURE

The radiation-detecting apparatus embodies a radiation counter tube which generates an electrical pulse response to each radiation incident upon the tube to produce a resulting pulse train whose repetition rate corresponds to the radiation level at the tube. A clipping amplifier is connected to the output of the counter tube to limit the amplitude of the pulse train to a constant value. A linear count rate circuit is connected to the output of the clipping amplifier and has a cut off frequency to produce as an output therefrom a DC signal directly proportional to the pulse repetition rate and a fluctuating error signal proportional to the square root of the pulse repetition rate. A high pass filter is connected to the output of the linear count rate circuit. A nonlinear count rate circuit is also connected to the output of the clipping amplifier and has a cut off frequency substantially lower than that of the linear count rate circuit to produce a DC signal proportional to the square root of the pulse repetition rate. Alarm circuitry differentially combines the output of the high pass filter and the nonlinear count rate circuit to detect only abrupt changes in the sensed radiation level.

*Contractual origin of the invention*

The invention described herein was made in the course of, or under, a contract with the United States Atomic Energy Commission.

This invention relates to apparatus for the detection of radiation contamination in a sample. More particularly, this invention relates to apparatus for the detection of radiation contamination of personnel, including their hands and feet, in the presence of a widely variable background radiation.

Most radiation monitors, especially those for use in personnel monitoring, use a GM tube as the sensor which produces an output pulse for each detected incidence of radiation. The pulse output signal is then integrated in a circuit having a known decay rate, sometimes called a count rate circuit. The integrator output is fed into an alarm circuit the threshold of which is set at some acceptable level. When the count rate exceeds a predetermined value, the integrator signal output overcomes the threshold of the alarm circuit and an alarm signal is present at the output.

If the samples are to be observed in the presence of background radiation, the threshold of the alarm circuit must be set at some level above that of the maximum average background. In such case, since the incidence of both background and sample radiation is inherently random in nature, the alarm level must be set by selecting some acceptable probability of false alarms which will determine the amount above the maximum average background at which the threshold must be set. For example, to achieve a probability of $10^{-5}$ false alarms per second assuming a Gaussian distribution of background radiation pulses and a one-second sampling time, the threshold must be set at 4.3 standard deviations above the maximum average background level. Since the input to the alarm circuit represents the sum of both background and sample radiation, such a system will be relatively insensitive to sample radiation in the presence of a low background radiation and over-sensitive to sample radiation in the presence of a high background radiation.

One prior art method of reducing the effect of background radiation is to provide two radiation sensors; one measuring sample plus background radiation and the other measuring background only. When the outputs of the two sensors are subtracted, there results a signal proportional to sample radiation only. Such a system is described in "Monitor for Airborne Alpha Particles" by Knowles, Nucleonics (McGraw-Hill), June 1955, page 98.

The main object of the present invention is to provide apparatus for the detection of radiation contamination of a sample in the presence of a widely variable background radiation.

It is another object of this invention to provide apparatus for the detection of radiation contamination of a sample in the presence of background radiation, which apparatus is adapted to process the signal obtained from a GM tube to detect abrupt changes in the radiation level while discriminating against slowly varying changes and the quiescent level.

It is yet another object of this invention to provide apparatus for the detection of radiation contamination of a sample in the presence of a fluctuating background radiation wherein only one radiation sensor is required.

In general, the objects of the present invention are accomplished by circuitry which eliminates the average value of the output signal of the integrator circuit, described above as feeding the alarm circuit, by blocking the DC component of the integrator output, and adjusts the threshold of the alarm circuit proportional to the square root of the count rate, thereby eliminating to a second-order approximation the effect of the average value of background and sample radiation. The parameters of the system are chosen so that it is made sensitive only to the relatively rapid increases in count rate caused by passing a contaminated sample before the monitor and is rendered insensitive to the more slowly varying changes caused by the background radiation level.

Further understanding of the invention may be obtained by consideration of the following description with reference to the accompanying drawings in which:

FIGURE 1 is a schematic drawing of a conventional count rate circuit;

FIGURE 2 is a block schematic diagram of one form of apparatus embodying the present invention; and FIGURE 3 is a detailed circuit diagram of the apparatus of FIGURE 2.

As indicated above, the problem in detecting radiation contamination of personnel, including their hands and feet, is to distinguish between background radiation and radiation of the contaminated sample. In a typical situation, such as personnel leaving a reactor area, it has been found that the background radiation can vary by two orders of magnitude, but that this variation takes place over a relatively long time as compared with the time required for a person to pass in front of a monitor or present his hands or feet to a monitor. The present invention effectively discriminates against background radiation by using a system that is sensitive only to abrupt increases in count rate.

In order to better understand the present invention, certain properties of the count rate circuit will first be considered. (See Electronics, Elmore and Sands, volume V-1, National Nucleonics Radiation Series, McGraw-Hill Book Company (1949), page 250, for a more complete analysis.)

Referring to FIGURE 1 and designating the voltage at A therein $v_0$, Elmore and Sands point out that, with applied input pulses 9 as shown, if $$T > 5R_{10}C_{11}, \text{ and} \quad (1)$$
$$C_{13} \gg C_{11}, \text{ and} \quad (2)$$
$$E \gg \bar{v}_0, \text{ then} \quad (3)$$
$$\bar{v}_0 = \bar{n}qR_{12} = \bar{n}C_{11}ER_{12} \quad (4)$$

The first two conditions (1) and (2) insure that $C_{11}$ will be fully charged during each pulse. The third condition (3) insures that the charge accumulated in $C_{13}$ per unit input pulse is constant, resulting in the linear relationship between the average voltage at A, $\bar{v}_0$, the bar over the symbol indicating an average, and the average count rate ($\bar{n}$) expressed in Equation 4.

Elmore and Sands also derive a relationship for a mean square fluctuation voltage at the output of the count rate circuit caused by the random occurrence of the input pulses. Assuming a random distribution of input pulses, as is the case with a radiation detector, the following equation describes this voltage fluctuation:

$$(\Delta v_0)^2 = \frac{nC^2{}_{11}E^2R_{12}}{2C_{13}} \quad (5)$$

(An error appears in Equation 5 on page 252 in Electronics, supra: $R_{12}$ should appear in the first power and not squared as a simple dimensional analysis will show.)

It is obvious that in order for the count rate circuit to respond to a rapid increase in count rate, the product of $R_{12}C_{13}$, called the time constant here, must be relatively small since it is this time constant that determines the cut off frequency $$\left( f_{co} = \frac{1}{2\pi R_{12}C_{13}} \right)$$

of the circuit. On the other hand, from Equations 4 and 5 it can be seen that $$\frac{\bar{v}_0}{\Delta v_0} = \sqrt{2\bar{n}C_{13}R_{12}} \quad (6)$$

which indicates that the time constant should be large to minimize the fluctuation in the output voltage.

When the average count rate ($\bar{n}$) exceeds the cut off frequency of the count rate circuit, there is a substantial loss of signal through $C_{13}$ and the output voltage is no longer linearly related to the input count rate. This fact, together with the fact that as condition (3) above is exceeded, the output voltage will taper off at the higher count rates since less charge will be transferred through $C_{11}$, are used in the present invention to obtain an empirical design of a circuit which has an average output voltage which is a function of the square root of the average count rate. This empirically-designed circuit is herein referred to as a nonlinear count rate circuit.

Referring to FIGURE 2, reference numeral 20 designates a conventional GM tube 20 which is sensitive to radiation particles and produces an output pulse for each radiation incidence sensed. Hence, the output of the GM tube 20 is a train of electrical pulses having a repetition rate proportional to the radiation level. This train of pulses is clipped by a clipping (limiting) amplifier 22, the output of which is fed to a linear count rate circuit 24 and a non-linear count rate circuit 26. The linear count rate circuit 24, as described above, produces an output voltage corresponding to the quantity $K_1\bar{n} + K_2\sqrt{\bar{n}}$, $K_1$ and $K_2$ being proportionality constants. The first component in the DC voltage referred to in Equation 4; the second component is the fluctuation voltage described in Equation 5. The fluctuation voltage is a second order effect which is present in this case since the time constant of the linear count rate circuit is relatively small to enable it to respond to abrupt increases in the average count rate.

A high pass filter 28 is connected to receive the output of count rate circuit 24, thereby eliminating the average value of the output of the linear count rate circuit 24; hence, the voltage at the output of filter 28 may be represented by the quantity $$K_1\Delta\bar{n} + K_2\sqrt{\bar{n}} \quad (7)$$

wherein $\Delta\bar{n}$ represents abrupt changes in the average count rate.

The nonlinear count rate circuit 26 has a much longer time constant than the linear count rate circuit 24 so that it responds only to changes in background radiation and is insensitive to the abrupt changes in the average count rate. The nonlinear count rate circuit 26 has a DC output corresponding to the quantity $K_2\sqrt{\bar{n}}$, $K_3$ being a proportionality corresponding to the quantity $K_3\sqrt{n}$, $K_3$ being a proportionality constant; and since it has a relatively long time constant, the fluctuation in output voltage of the nonlinear count rate circuit 26 is relatively small and may be considered negligible here.

Still referring to FIGURE 2, the output of the high pass filter 28 is then fed into an alarm circuit 30 having a set threshold. In order to compensate for the voltage fluctuation at the output of the linear count rate circuit 24, and passed by the filter 28, the threshold of the alarm circuit 30 is adjusted by the output of the nonlinear count rate circuit 26 so that as the average background level changes, the threshold of the alarm circuit 30 is correspondingly changed, to thereby render the alarm circuit 30 insensitive to slowly varying changes in the average radiation level. On the other hand, since the nonlinear count rate circuit 26 has a longer time constant, it cannot respond to the abrupt increase in count rate caused by a contaminated sample passed in front of the monitor. The result is that the over-all system is responsive to abrupt changes in the count rate and rendered insensitive, at least to a second order approximation, to the more slowly varying changes in count rate due to the steady state radiation of both background and sample.

In FIGURE 3, wherein a detailed circuit diagram of an apparatus embodying the present invention is shown, tube $T_1$ is a conventional GM tube which causes a negative pulse at the base of transistor $Q_1$ for each radiation incidence sensed by the tube $T_1$. Transistors $Q_1$ and $Q_2$ form the clipping amplifier 22 comprising a simple two-stage RC coupled grounded emitter circuit. The design requirements dictate that for every input pulse from the GM tube $T_1$, the clipping amplifier 22 produces an output which will satisfy the following inequalities:

$$T > C_{32}(R_{sat} + R_{34}) \quad (8)$$
$$T > C_{36}(_{sat}) \quad (9)$$
$$1/n \gg R_{38}C_{32} \quad (10)$$
$$1/n \gg R_{38}C_{36} \quad (11)$$

where $n$ is the count rate in counts per second (c.p.s.), T is the pulse width in seconds, and $R_{sat}$ is the saturation resistance of transistor $Q_2$. For this application, T=20–50 $\mu$sec. depending on the tube $T_1$ used and the parameters of transistors $Q_1$ and $Q_2$ and $n_{maximum}$=333 c.p.s.

The input at B in FIGURE 3 to both the linear count rate circuit 24 and the nonlinear count rate circuit 26 is a train of electrical pulses with a repetition rate proportional to the radiation level sensed by the tube $T_1$. The linear count rate circuit 24 produces an output voltage at C described by Equation 7 above and has a cut off frequency approximately 0.33 cycle per second. Transistor $Q_3$ and its associated circuitry forms an emitter follower circuit used as a buffer amplifier to present a high impedance load to the linear count rate circuit 24, and at the same time, a low impedance drive source to the alarm circuit 30. Capacitor 40 and the output impedance of the nonlinear count rate circuit 26 form the high pass filter 28 which blocks the DC component of the output of the buffer amplifier $Q_3$.

The nonlinear count rate circuit 26 is simply a count rate circuit operated in a nonlinear range with a cut off frequency approximately 0.026 cycle per second. The design is empirical and produces the characteristic that the output is proportional to the square root of the average count rate.

The alarm circuit 30 is the low power silicon controlled switch $Q_4$, being driven from the output of the high pass filter 28 and the nonlinear count rate circuit 26. Note that the outputs of the high pass filter 28 and the nonlinear count rate circuit 26 are of opposite polarity and thus can be summed in the input of the alarm circuit 30. Transistor $Q_5$ gives a reference voltage for the alarm circuit 30 and is used to compensate for temperature changes in the firing voltage of the silicon controlled switch $Q_4$.

An automatic reset feature is incorporated into the circuit by driving the silicon controlled switch $Q_4$ from a 60 cycle line at D. This takes advantage of the fact that the silicon controlled switch $Q_4$ acts as a controlled half wave rectifier of the AC power supply.

Persons skilled in the art will, of course, readily adapt the teachings of the present invention to embodiments different than the embodiment illustrated. Accordingly, the scope of the protection afforded the invention should not be limited to the particular embodiment shown in the drawings and described above but shall be determined only in accordance with the appended claims.

The embodiments of the invention in which an exclusive property or privilege is claimed are defined as follows:

1. Apparatus for detecting radiation contamination of a sample in the presence of background radiation comprising:
   (1) means for sensing nuclear radiation and for generating an electrical pulse signal responsive to each radiation incidence sensed;
   (2) integrating means connected to said sensing means for producing a signal proportional to the repetition rate of said pulse signals;
   (3) means connected to said integrating means for filtering out the steady-state value of the output voltage of said integrating means;
   (4) means also connected to said sensing means for generating a signal proportional to the square root of the repetition rate of said pulse signals; and
   (5) circuit means for differentially combining the output of said filtering means and the output of said square root generating means, whereby a signal is obtained responsive only to abrupt changes in the sensed radiation level.

2. Apparatus for detecting radiation contamination of a sample in the presence of background radiation comprising:
   (1) a radiation counter tube for generating an electrical pulse responsive to each radiation incidence upon said tube, whereby the repetition rate of the resulting pulse train corresponds to the radiation level at said tube;
   (2) clipping means connected to the output of said counter tube for limiting the amplitude of said pulses to a constant value;
   (3) a linear count rate circuit connected to the output of said clipping means for producing a DC signal directly proportional to the pulse repetition rate, said linear count rate circuit having a cut off frequency of sufficient magnitude as to be responsive to abrupt changes in the pulse repetition rate caused by a contaminated sample passing before said counter tube, whereby a fluctuating error signal is also produced at the output of said linear count rate circuit proportional to the square root of the pulse repetition rate;
   (4) a high pass filter connected to the output of said linear count rate circuit;
   (5) a nonlinear count rate circuit also connected to the output of said clipping means for producing a DC signal proportional to the square root of the pulse repetition rate, said nonlinear count rate circuit having a cut off frequency substantially lower than the cut off frequency of said linear count rate circuit; and
   (6) circuit means for differentially combining the output of said filter and the output of said nonlinear count rate circuit, whereby a signal is obtained responsive only to abrupt changes in the pulse repetition rate.

3. Apparatus for detecting radiation contamination of a sample in the presence of background radiation comprising:
   (1) a radiation counter tube or generating an electrical pulse responsive to each radiation incidence upon said tube, whereby the repetition rate of the resulting pulse train corresponds to the radiation level at said tube;
   (2) clipping means connected to the output of said counter tube for limiting the amplitude of said pulses to a constant value;
   (3) a linear count rate circuit connected to the output of said clipping means for producing a DC signal directly proportional to the pulse repetition rate, said linear count rate circuit having a cut off frequency of sufficient magnitude as to be responsive to abrupt changes in the pulse repetition rate caused by a contaminated sample passing before said counter tube, whereby a fluctuating error signal is also produced at the output of said linear count rate circuit proportional to the square root of the pulse repetition rate;
   (4) a high pass filter connected to the output of said linear count rate circuit;
   (5) a nonlinear count rate circuit also connected to the output of said clipping means for producing a DC signal proportional to the square root of the pulse repetition rate, said nonlinear count rate circuit having a cut off frequency substantially lower than the cut off frequency of said linear count rate circuit;
   (6) alarm means connected to said filtering means for producing a signal responsive to a condition wherein the output signal of said filtering means exceeds a set threshold; and
   (7) circuit means for adjusting the threshold setting of said alarm means responsive to the output of said nonlinear count rate circuit.

4. The apparatus of claim 3 wherein the cut off frequency of the linear count rate circuit is approximately 0.33 cycle per second.

5. The apparatus of claim 4 wherein the cut off frequency of the nonlinear count rate circuit is approximately 0.026 cycle per second.

References Cited
UNITED STATES PATENTS

| | | | |
|---|---|---|---|
| 2,932,743 | 4/1960 | Atwood | 250—83.6 |
| 2,986,636 | 5/1961 | Carlson et al. | 250—83.6 |
| 3,244,880 | 4/1966 | Owen | 250—83.1 |

ARCHIE R. BORCHELT, *Primary Examiner.*